United States Patent
Farahbakhshian et al.

(10) Patent No.: US 10,402,994 B2
(45) Date of Patent: Sep. 3, 2019

(54) 3D BODY SCANNER DATA PROCESSING FLOW

(71) Applicant: Naked Labs Austria GmbH, Vienna (AT)

(72) Inventors: Farhad Farahbakhshian, San Jose, CA (US); Peter Kreuzgruber, Vienna (AT)

(73) Assignee: Naked Labs Austria GmbH, Vienna (AT)

( * ) Notice: Subject to any disclaimer, the term of this patent is extended or adjusted under 35 U.S.C. 154(b) by 0 days.

(21) Appl. No.: 15/573,220

(22) PCT Filed: May 12, 2016

(86) PCT No.: PCT/EP2016/060803
§ 371 (c)(1),
(2) Date: Nov. 10, 2017

(87) PCT Pub. No.: WO2016/180957
PCT Pub. Date: Nov. 17, 2016

(65) Prior Publication Data
US 2018/0137640 A1 May 17, 2018

Related U.S. Application Data

(60) Provisional application No. 62/160,606, filed on May 13, 2015.

(51) Int. Cl.
*G06T 5/00* (2006.01)
*G06T 7/60* (2017.01)
*G06T 17/20* (2006.01)

(52) U.S. Cl.
CPC ............ *G06T 7/60* (2013.01); *G06T 5/009* (2013.01); *G06T 17/20* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| 8,068,676 B2 * | 11/2011 | Zhang | G06K 9/00362 382/111 |
| 2007/0268295 A1 * | 11/2007 | Okada | G06K 9/00369 345/474 |
| 2018/0137640 A1 * | 5/2018 | Farahbakhshian | G06T 7/60 |

OTHER PUBLICATIONS

PCT Search Report, dated Nov. 23, 2016.
(Continued)

*Primary Examiner* — Tahmina N Ansari
(74) *Attorney, Agent, or Firm* — Dority & Manning, P.A.

(57) ABSTRACT

A method implemented with a smart body scanner with applications for online apparel retail, fitness, and healthcare applications includes, with a plurality of depth sensors implemented in the body scanner, creating 3D depth images of a body. In a hardware processing step, 3D depth images are generated as recorded part-images with saturated bright regions and lost dark regions. In a pre-processing step, using High Dynamic Range (HDR) processing, depth data obtained in the bright regions is combined with depth data obtained in the dark regions. In a model fusion step, a single 3D body model is created from a stream of the 3D depth images obtained from multiple angles of view during rotating of the body.

11 Claims, 19 Drawing Sheets

(56) References Cited

OTHER PUBLICATIONS

International Preliminary Report on Patentability, dated Nov. 23, 2017.
Article—Theobalt C et al, "Seeing People in Different Light-Joint Shape, Motion, and Reflectance Capture", IEEE Transactions on Visualization and Computer Graphics, IEEE Service Center, Los Alamitos, CA, US, (Jul. 1, 2007), vol. 13, No. 4, doi:10.1109/TVCG.2007.1006, ISSN 1077-2626, pp. 663-674, XP011190839 [I] 1-10.

* cited by examiner

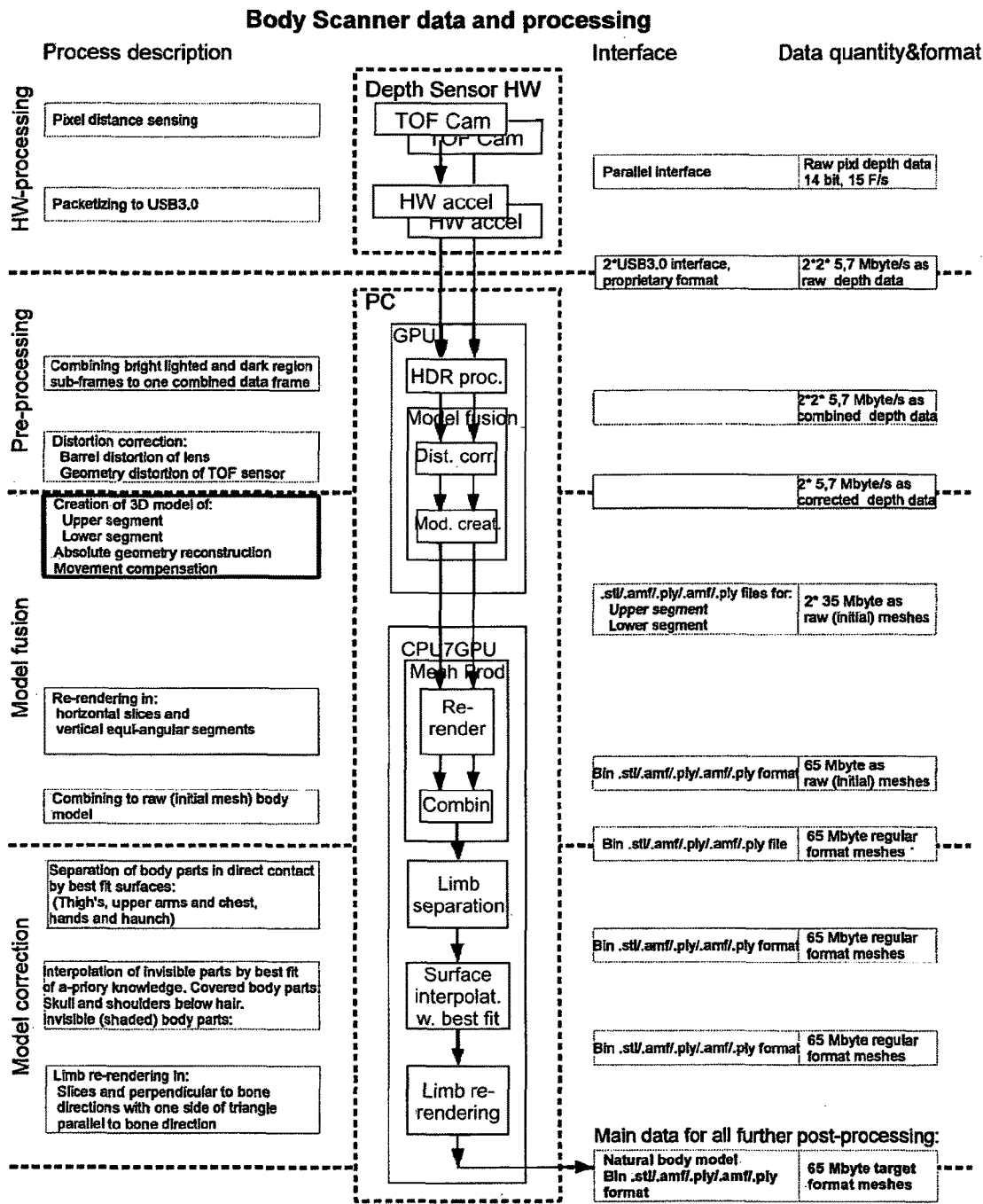
Figure 1a: Body Scanner data processing flow, HW partitioning, used SW partitioning, data formats and data quantities when using a 500x400 pixl depth sensor.

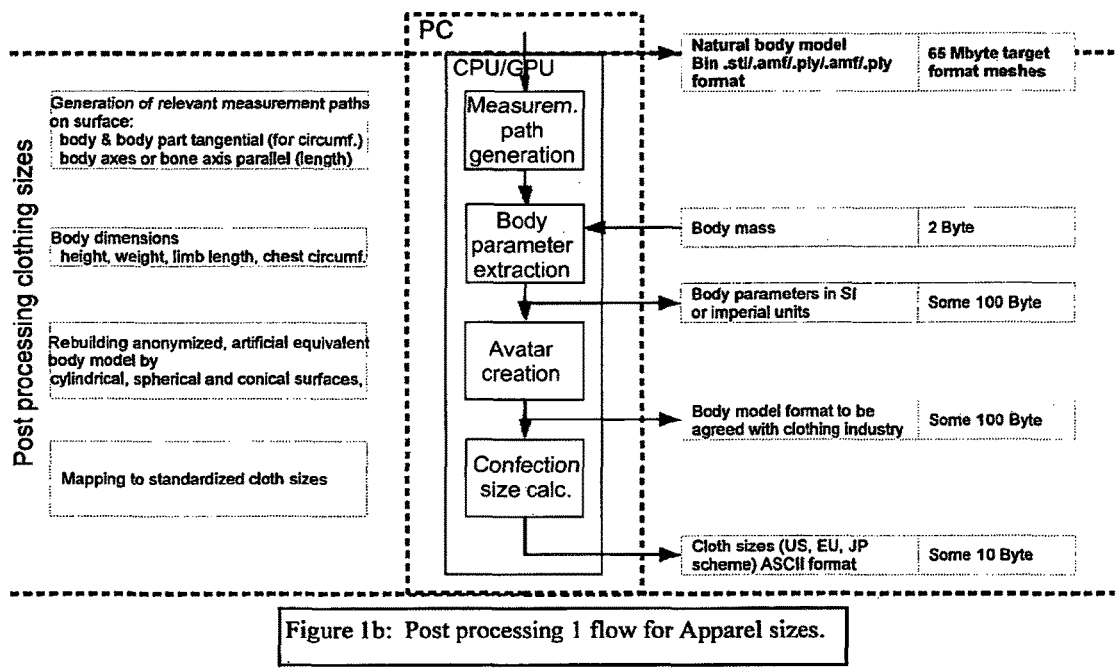
Figure 1b: Post processing 1 flow for Apparel sizes.

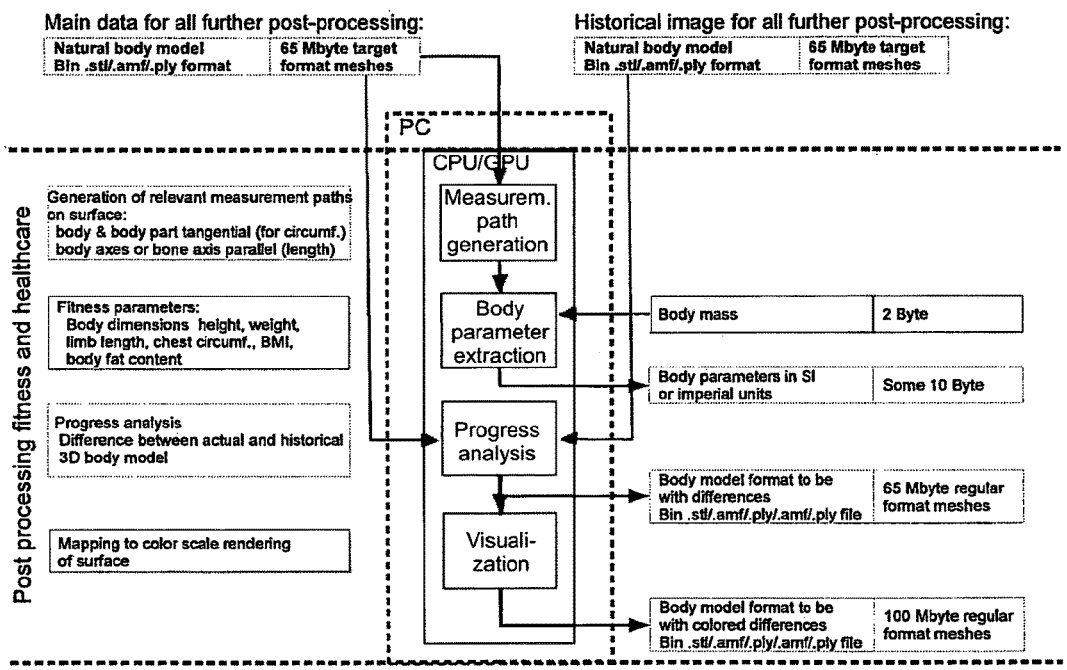
Figure 1c: Post processing 2 flow for fitness / healthcare applications.

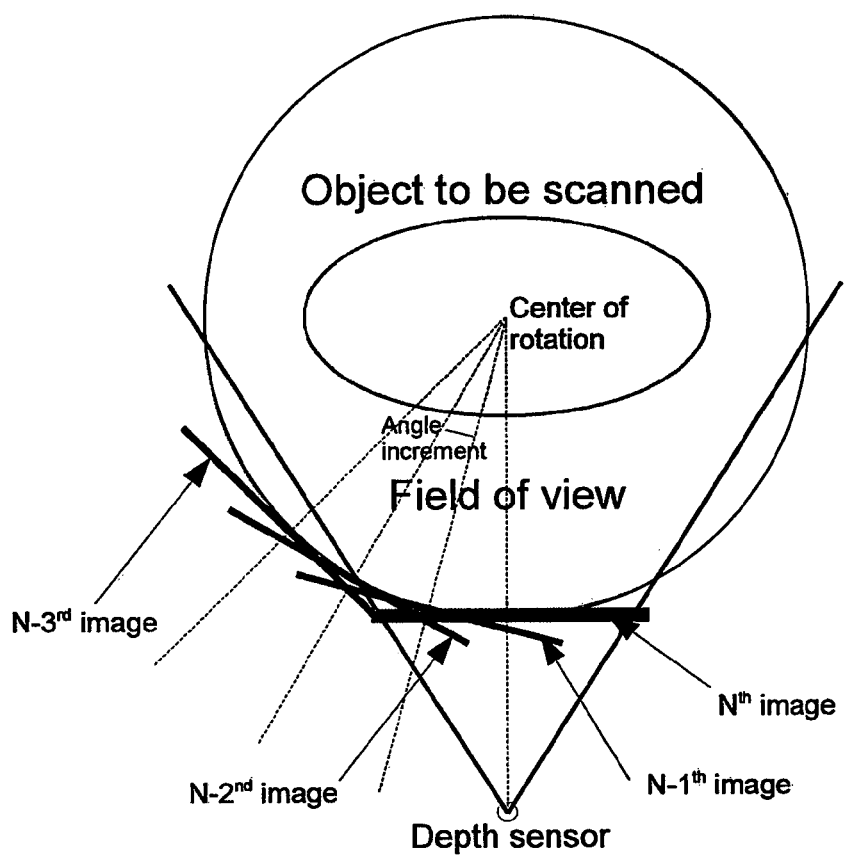
Figure 2: 3D scanning and 3D model fusion process

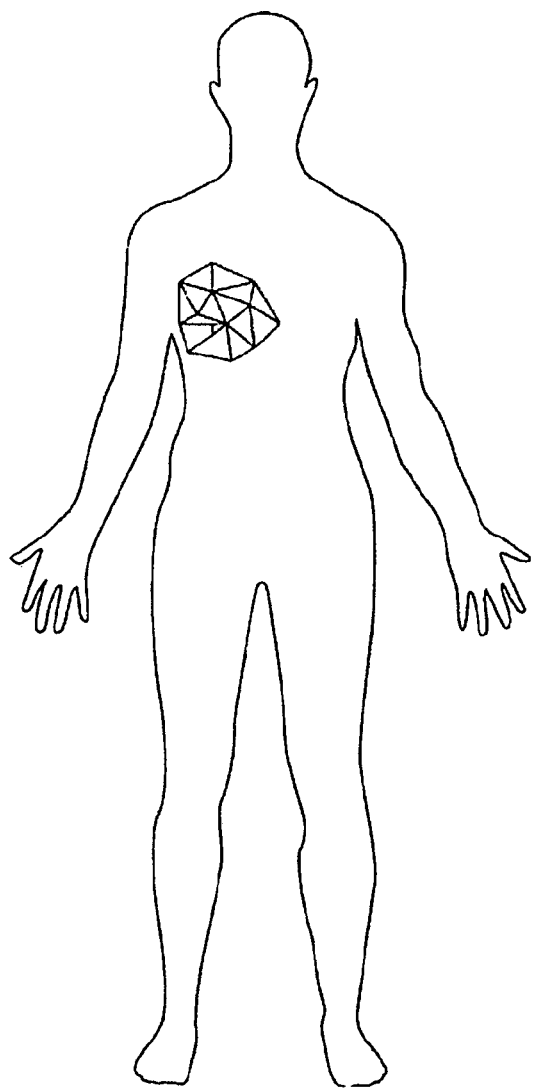
Figure 3: 3D model with uneven raw (initial) mashing.

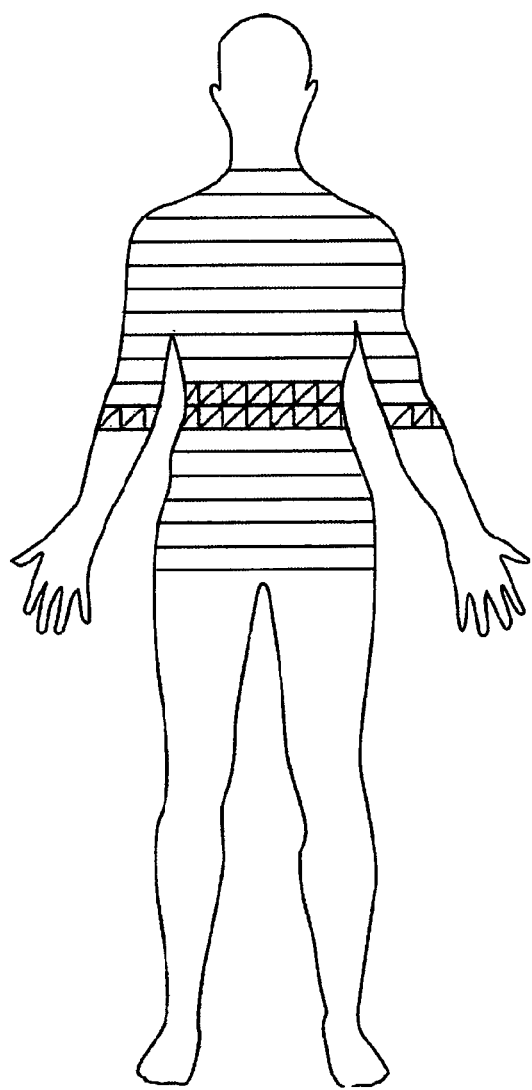
Figure 4: 3D model with re-formated meshes to horizontal slices with upright triangle sides

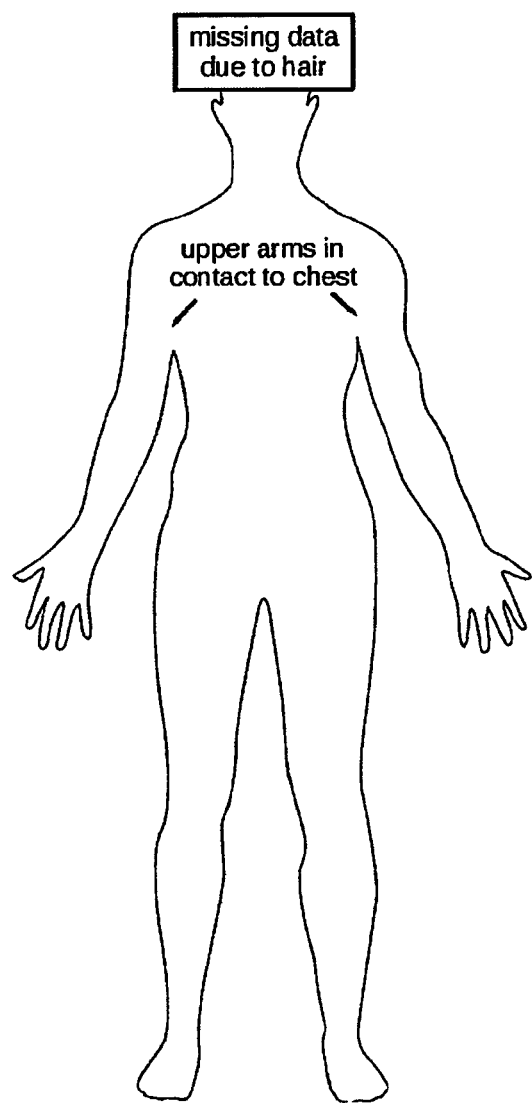
Figure 5: Not separated upper arms from chest and missing data due to hair

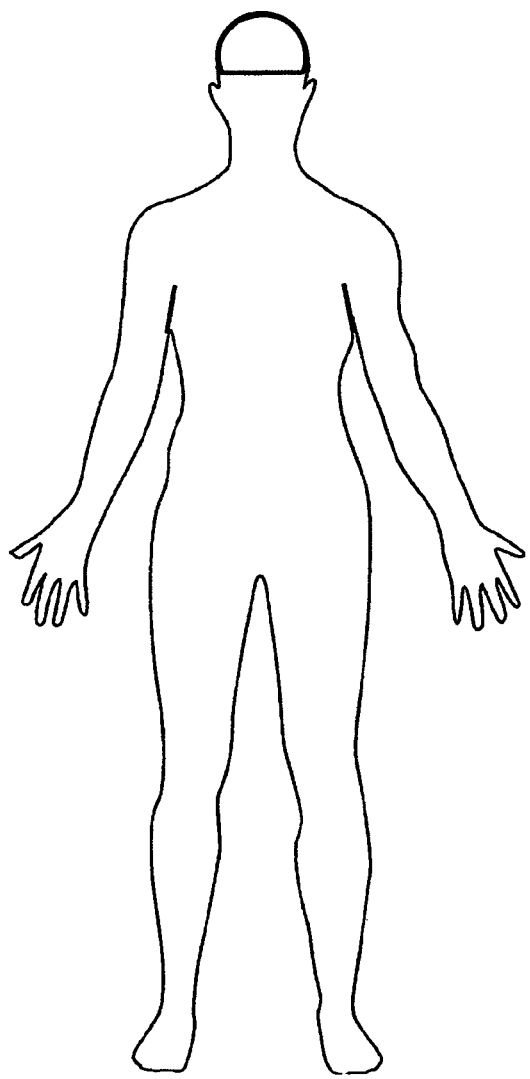
Figure 6: Corrected body model with arm separated from chest and a sphere-similar head model.

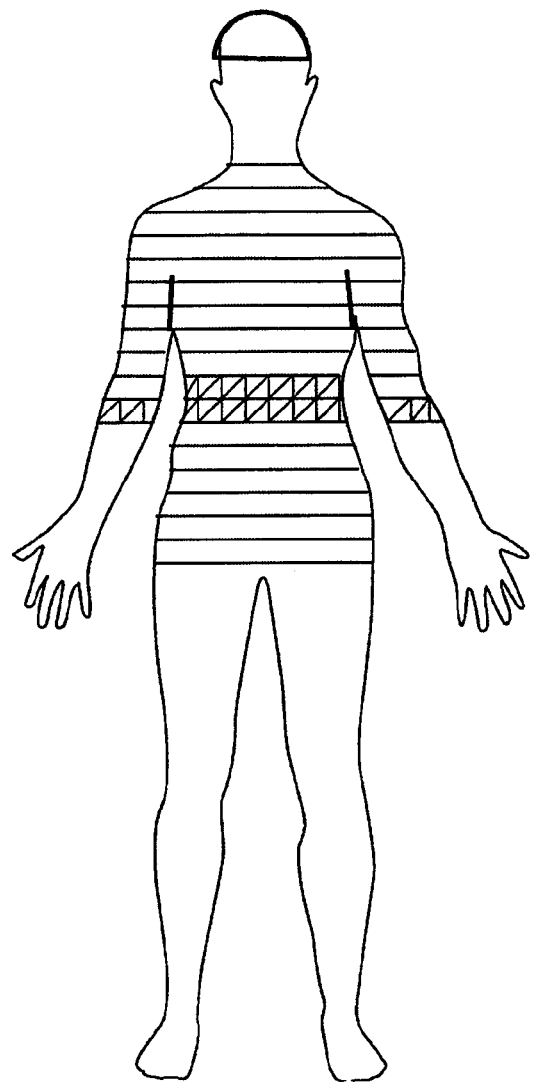
Figure 7: Corrected body model with arm separated from chest and a sphere-similar head model

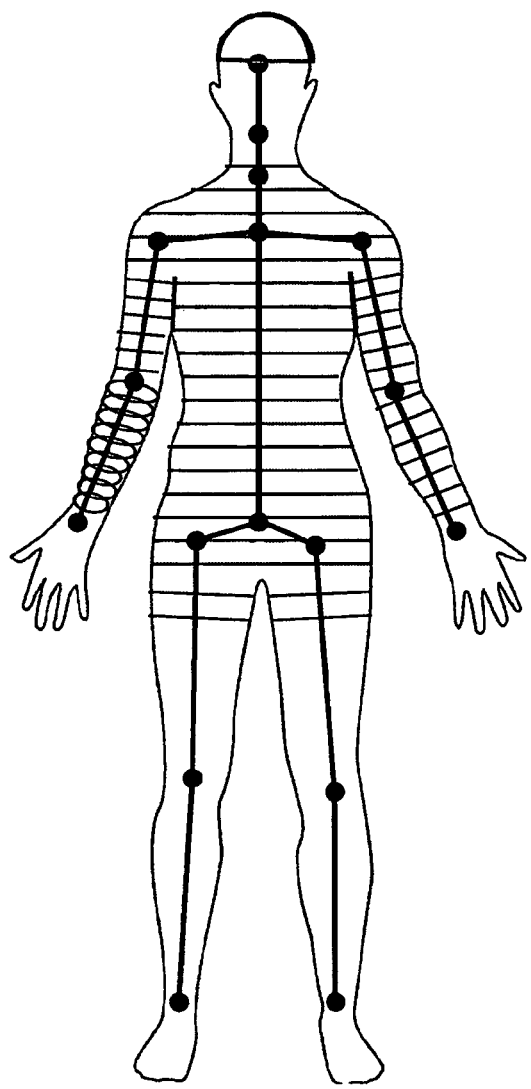
Figure 8: Final natural 3D body model with post processing optimum meshing.

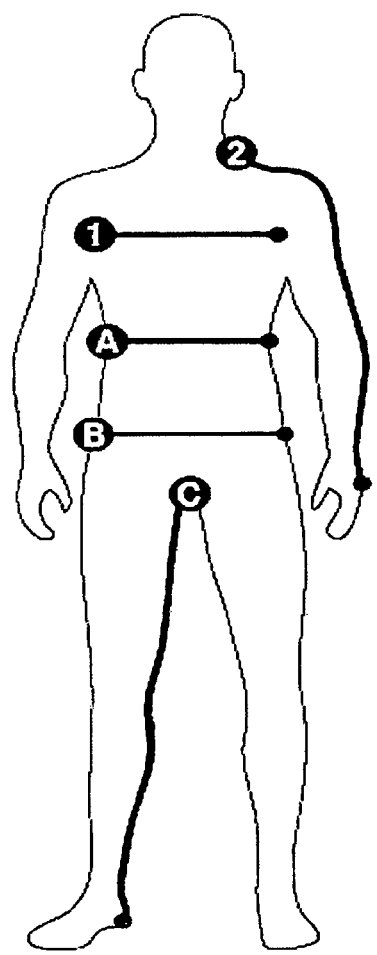
Figure 9: Example measurement paths for Apparel size determination

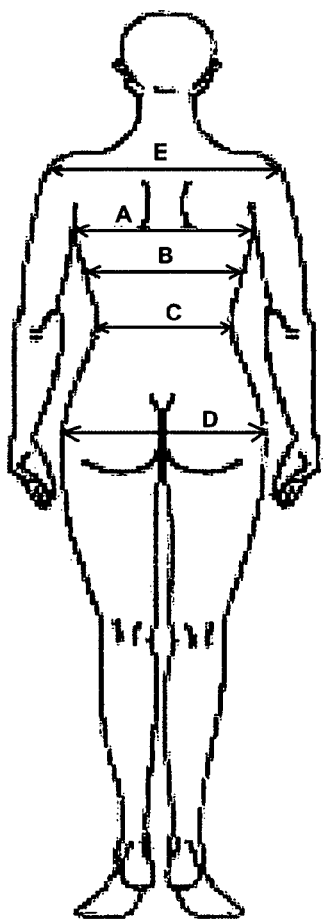
Figure 10: Example measurement paths for Apparel size determination

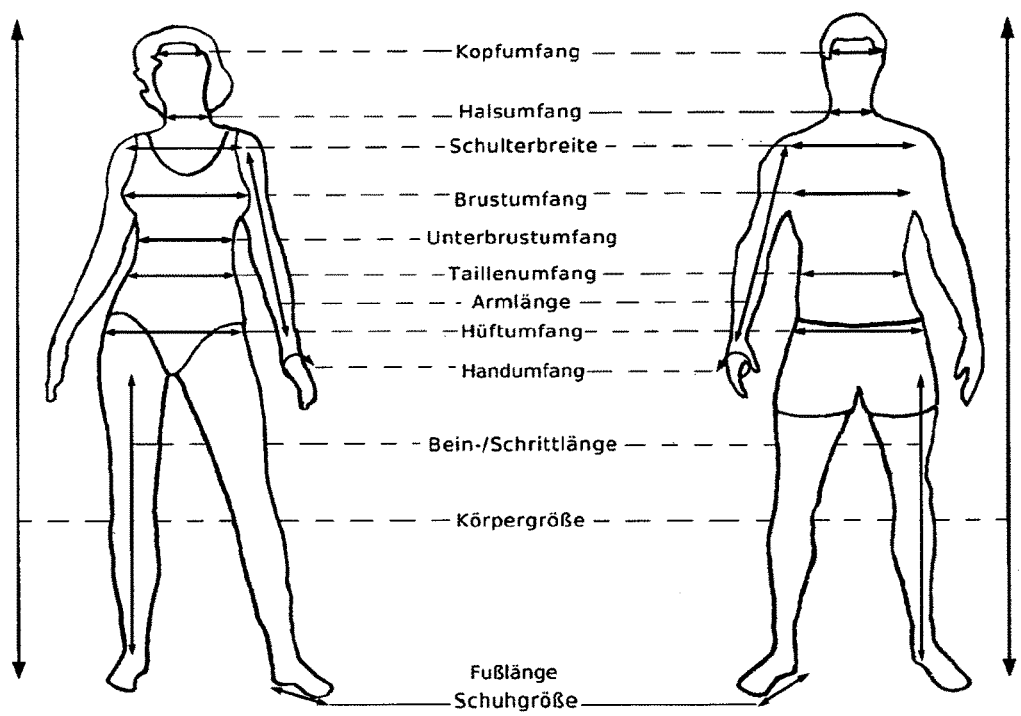
Figure 11: Example measurement paths for Apparel size determination.

Figure 12: Avatar composed by basic geometric shapes.

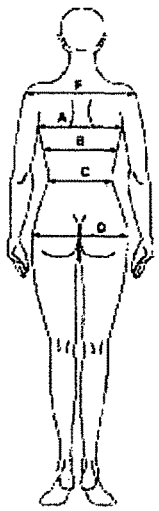
| WOMEN'S SIZE | | | | | | | | | | |
|---|---|---|---|---|---|---|---|---|---|---|
| IT | | | 36 | 38 | 40 | 42 | 44 | 46 | 48 | 50 | 52 |
| USA | | | 0 | 2 | 4 | 6 | 8 | 10 | 12 | 14 | 16 |
| | | | XS | | S | | M | | L | | XL |
| Chest/Breast | A | inch | 31.5 | 33.1 | 34.6 | 36.2 | 37.8 | 39.4 | 40.9 | 42.5 | 44.1 |
| | B | cm | 80 | 84 | 88 | 92 | 96 | 100 | 104 | 108 | 112 |
| Waist | C | inch | 23.6 | 25.2 | 26.8 | 28.3 | 29.9 | 31.5 | 33.1 | 34.6 | 36.2 |
| | | cm | 60 | 64 | 68 | 72 | 76 | 80 | 84 | 88 | 92 |
| Hip | D | inch | 33.9 | 35.4 | 37 | 38.6 | 40.2 | 41.7 | 43.3 | 44.9 | 46.5 |
| | | cm | 86 | 90 | 94 | 98 | 102 | 106 | 110 | 114 | 118 |
| Shoulders | F | inch | 13.4 | 14 | 15 | 15.5 | 16.1 | 16.5 | 16.8 | 17.1 | 17.4 |
| | | cm | 34 | 35.6 | 38 | 39.4 | 41 | 41.8 | 42.6 | 43.4 | 44.2 |
| Sleeve Length CB | G | inch | 29.2 | 29.8 | 30.6 | 31.1 | 31.7 | 32.1 | 32.4 | 32.6 | 33 |
| | | cm | 74.2 | 75.7 | 77.6 | 79 | 80.5 | 81.6 | 82.3 | 82.7 | 83.7 |
Figure 13: Mapping woman's body dimensions in apparel confection sizes.

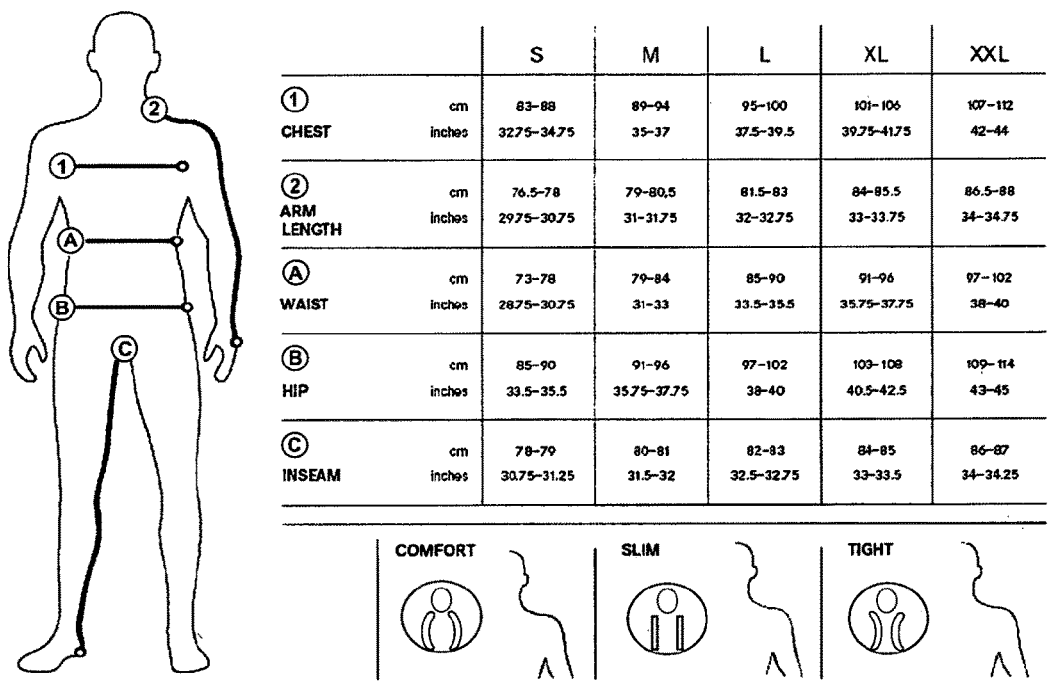
Figure 14: Mapping man's body dimensions in apparel confection sizes.

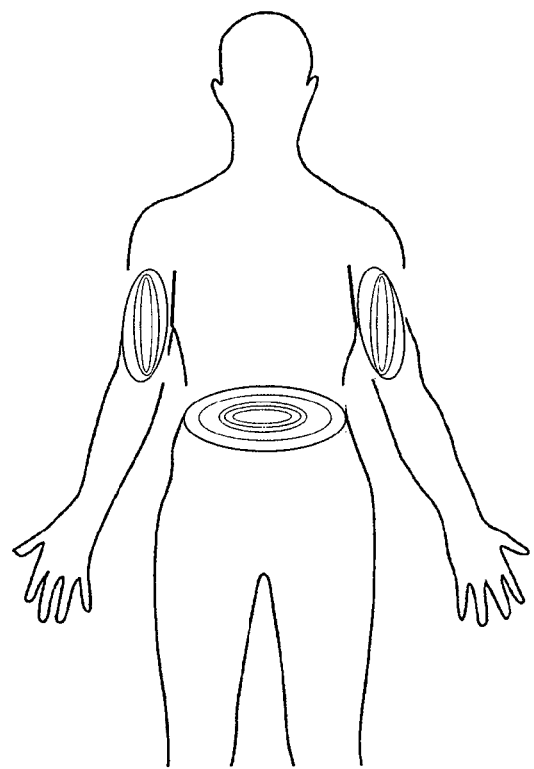
Figure: 15:  Example graphical representation of increased upper arm muscle mass and reduced belly fat.

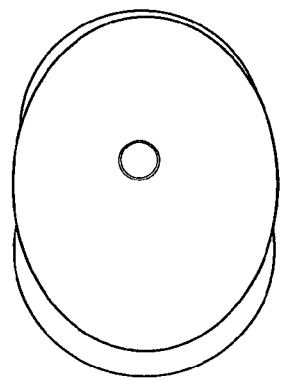
Figure: 16: Example graphical representation of increased upper arm muscle mass.

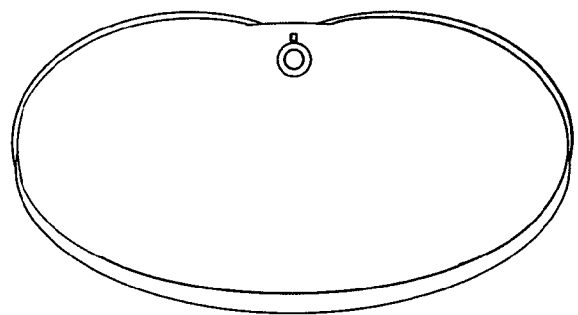
Figure: 17: Example graphical representation of reduced belly fat.

3D BODY SCANNER DATA PROCESSING FLOW

FIELD OF INVENTION

The present invention relates to the processing flow, algorithms and methods implemented in a smart body scanner with scale for online apparel retail and fitness and healthcare applications. Such a smart body scanner is built up by a turntable with scale and a number of depth sensors mounted on a mast to create 3D depth images of the body, which is slowly rotated on the turntable. In the processing flow to usable apparel sizes for online retail and fitness and health care parameters, the following processing steps are required:
1. Correction of the recorded 3D depth images from geometrical distortions of the optical system for depth measurement.
2. Correction of the recorded 3D depth images from systematical errors caused by the geometrical setup of the depth sensor units.
3. Model fusion of a series of recorded 3D depth images to a three dimensional natural raw body model.
4. Correction of imperfections of the scanning process.
5. Derivation of an avatar model and size parameters for online apparel retail business.
6. Derivation and visualizations and parameters for fitness and health monitoring purposes.

BACKGROUND

The fusion of 3D images to 3D models is today typically using algorithms where the trajectory of view around the object to be scanned is either well known or determined by complicated probability based algorithms like that in Microsoft's Kinect v2 SDK 3D fusion. In practice, these complicated algorithms frequently fail for too un-structured or too complicated objects to be scanned.

State of the art for apparel size determination is to manually measure body dimensions of merit, then looking up retail apparel sizes in simple tables based on such measurements. The manual measurements are performed by flexible measurement tapes, in some shops also with special mechanical gauges.

Only the derivation of shoe sizes is sometimes electrically assisted by X-ray cameras.

In the field of fitness and body building, the measurement of increase of muscular mass or the progress in losing fat is also, as state of the art, measured by mechanical measurement using a flexible tape to determine limb/chest circumferences. An indication on which position the muscle mass is changing (for example ventral/dorsal) cannot be given.

Analysis methods giving this information, and furthermore give a graphically representation thereof, are up to now the domain of sophisticated and extremely expensive medical equipment like computer tomography, ultrasonic analysis, or X-ray layer analysis.

Other fitness/medical parameters like lung volume are, as state of the art, measured by highly expensive special equipment as integrating flux meters and not by 3D body analysis methods.

BRIEF DESCRIPTION OF THE DRAWING

FIG. 1a shows the processing flow from pixel sensing to the availability of a natural 3D body model using a pair of depth sensors. The depth sensors may be of any concept, like Time Of Flight (TOF) sensors, Structures Light (STL) sensors, Stereo Vision (SVI) sensors, structured light assisted Stereo Vision (STL-SVI) sensors, or any other concept. The processing is segmented in 4 layers: hardware processing; pre-processing; model fusion; and model correction.

FIG. 1b depicts determination of apparel retail parameters in a post processing flow chart.

FIG. 1c depicts determination of fitness and healthcare parameters in a post processing flow chart.

FIG. 2 depicts polar coordinate transformation of a $1^{st}$ depth image related to a central point of a rotation axis of the body.

FIG. 3 depicts 3D modeling wherein the vertices (3D points) in the mesh are uneven triangles.

FIG. 4 depicts 3D modeling with the uneven vertices (3D points) of the initial mesh reformatted.

FIG. 5 depicts a body scan model with missing data due to hair and body posture.

FIG. 6 depicts a corrected body scan model wherein the person's limbs are separated.

FIG. 7 depicts a corrected body scan model with the person's arms separated from the chest and a head model to correct for errors due to hair.

FIG. 8 depicts a final correct body scan model.

FIGS. 9 through 11 depict measurement paths on the body can model for apparel size estimations.

FIG. 12 depicts an avatar creation of an unspecific, anonymous body model.

FIG. 13 depicts a women's apparel sizing system.

FIG. 14 depicts a men's apparel sizing system.

FIG. 15 depicts a graphical representation on a body scan model of increased muscle mass and reduced belly fat.

FIG. 16 depicts a graphical representation on a body scan model of increased muscle mass viewed in a direction perpendicular to the bone axis.

FIG. 17 depicts a graphical representation on a body scan model of reduced belly fat viewed in a direction transverse to the body plane.

DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

With respect to FIG. 1a, the following processing layers are relevant:

Hardware Processing

Depth data generation, illumination management, averaging and packetizing for transportation to a powerful Graphics Processing Unit (GPU).

Pre-Processing

In pre-processing the imperfections of the depth sensor like barrel distortion of optical lenses, distortion caused by geometric depth sensor setup (for example Transmitter-Receiver (TX-RX) distance) are rectified.

Model Fusion

Model fusion creates from depth data a rough 3D body model that may cover the whole or only a part of the body. Also the merge of possibly multiple part 3D scans by multiple depth sensors is performed there. It the most complex and calculation power consuming process.

Model Correction

Correction of unavoidable scanning errors and reformatted the 3D meshes in an easily usable way.

Invisible body parts covered by hair are replenished

Body parts in direct contact are separated by best fit surfaces

Meshes are reformatted in an easily usable skeleton direction way

The result is a nice, easy to process natural body model

FIG. 1b presents the determination of apparel retail parameters in post processing 1.

Post Processing 1 for Retail Apparel Sizes

This is a comparably simple processing step where:

The parameters of an Avatar are created

Apparel retail parameters are calculated

FIG. 1c presents the determination of fitness and healthcare parameters in post processing 2

Post Processing for Fitness/Healthcare

Body mass and height

Body mass index and body fat content

Boy building progress and loss of body fat and weight

Lung volume

Pregnancy tracking

To determine the apparel sizes and fitness and healthcare parameters the invention proposes to use the following advantageous processing flow: Hardware Processing Referring again to FIG. 1a, hardware processing covers the generation of depth per pixel. The HW processing is strongly dependent on the type of depth sensor. It mainly is dynamic range management between bright (close in camera main direction) and dark (far, at the border of Field Of View) FOV) regions of the image. In most cases, this means like usage of variable light Transmit (TX) power and different integration times in the camera in charge.

This may give recorded part-images with saturated bright regions and such with lost dark regions which will be combined in the pre-processing.

Pre-Processing

In FIG. 1a, the pre-processing supports the following algorithms with reliable valid scaled depth data.

High Dynamic Range (HDR) Processing

Wide-angle image recording suffers from strong vignetting effect. This means intensity loss to the border of the image. The loss of signal intensity (vignetting effect) this goes implementation dependent at active lightened systems like TOF or STL with $\cos(\square)^6$ to $\cos(\square)^8$ law at natural lighted systems like SVI imaging with $\cos(\square)^2$ to $\cos(\square)^4$ law. The angle $\square$ means the deviation of the received ray from the optical axis of the camera.

High Dynamic Recording (HDR) processing combines depth data obtained in bright illuminated regions with that of low illuminated dark regions which are recorded under different depth sensor settings (e.g. active lightning TX power and camera integration time) to one valid data set.

Distortion Correction

Wide angle lenses naturally have a significant barrel distortion which has to be corrected to obtain correct measurement results.

One part of post-processing is to mathematically correct the barrel distortion. A $2^{nd}$ order correction (quadratic polynomial) is most likely sufficient.

Other deterministic distortions may be introduced by the unavoidable construction (e.g. TX RX separation in TOF or STL) of the depth sensor itself.

Model Fusion

The model fusion means creates a single unequivocal 3D body model from a stream of 3D depth images obtained from the rotating body from multiple angles of view. This is the most complex and computationally power hungry task in the whole processing flow.

Model fusion can be done with any type of depth sensor (Stereo Vision (SVI), Structured Light (STL) or Time of Flight (TOF)) as far as the interface s properly unified.

Basic Model Fusion Algorithm

A simple and advantageous model fusion algorithm may work in the following way:

The body to be scanned is turned around by a turntable. The turn-around time is much slower than the frame rate of the depth sensor(s).

During the turning around of the body, the depth sensor(s) provide a number of depth images that can be seen as depth image snap-shots at a certain instantaneous angle of rotation of the body. The depth data is available with respect to the position(s) of the depth sensor(s). The geometry of the depth sensors with respect to the vertical rotation axis of the turntable (height, distance) and the angular speed of the turntable are roughly known.

The model fusion is a cyclical running approximation process.

The depth information of the $1^{st}$ depth image is transformed to polar coordinates related to the geometrically best guess central point of the rotation axis of the body, as shown in FIG. 2.

The depth information of the $2^{nd}$ depth image is transformed to polar coordinates related to the geometrically best guess central point of the rotation axis of the body. Then it is rotated by the estimated angular increment between the depth images.

Then the cross correlation between the $1^{st}$ and the $2^{nd}$ image is calculated with respect to rotation angle, height (z), and distance multiplier to the best guess point of vertical rotation axis is calculated. When the geometry is not accurately known, also a shift in the horizontal (x/y) plane and a vertical tilt of the depth sensor has to be taken into account.

When the maximum of correlation is found, the $2^{nd}$ image is transformed to this optimum position and the overlapping parts between the $1^{st}$ and $2^{nd}$ image are averaged to an improved image. From this improved image, a better guess of the vertical rotation axis is calculated.

The depth information of the $3^{rd}$ depth image is transformed to polar coordinates related to the new best guess central point of the rotation axis of the body. Then it is rotated by the estimated angular increment between the $2^{nd}$ and $3^{rd}$ depth image.

Then the cross correlation between the improved image (from averaging from 1st and 2nd image) and the 3rd image is calculated with respect to rotation angle, height (z), and distance multiplier to the best guess point of vertical rotation axis is calculated. When the geometry is not accurately known, also a shift in the horizontal (x/y) plane and a vertical tilt of the depth sensor has to be taken into account.

When the maximum of correlation is found, the $3^{rd}$ image is transformed to this optimum position and the overlapping parts between the improved image and $3^{rd}$ image are averaged to a further improved image. From this improved image a further better guess of the vertical rotation axis is calculated.

This process is cyclically ongoing until it is almost around the image to be scanned.

At the end of the process, when the last depth images overlap with the first ones, the images are correlated to close the loop.

Finally, an accurate, but from mesh composition and completeness rough, 3D body model of the whole or a part of the body is available and its axis of rotation is accurately determined.

One advantage of the described method is that it works with a tight set of starting conditions and that the body motion between consecutive images is small and well known. This ensures proper convergence of model fusion.

The averaging of multiple 3D images taken over a significant time span smoothes out noise and quantization effects of the measured surface and to some extent compensates slight body motions as they are unavoidable at standing still of a human.

Nevertheless any other simpler or more complicated model fusion algorithm may be used.

Re-Rendering for Sub Scan Combining

Depending on the type of depth sensor and the model fusion process, the vertices (3D points) in the mesh of the part model bay are uneven triangles with respect to horizontal or vertical direction, as shown in FIG. 3.

For further processing, it is advantageous to reformat uneven triangles of vertices (3D points) of the initial mesh in other meshes with vertices in equidistant slices in height, and wherein one side of the triangles is the line of greatest slope parallel to the vertical axis of the body, as depicted in FIG. 4.

The regular meshes ease the sub-scan combining to one model in the next step.

Sub Scan Combining

The 3D body scan data may be available in a number of sub-scans segmented in typically, but not limited to, various heights which have to be combined to one complete rough 3D body model.

It is advantageous that all depth sensors are synchronized in time such that the geometrical relation between their part models is given with a good initial accuracy in order to ease the sub-scan combining in angular range. To ease this process, means to simplify and minimize the required calculation effort are provided.

For the sub-scan combining, several advantageous methods exist:
  One simple solution is just fitting borders of non-overlapping sub-scans in a way that minimizes the discontinuity at the sub scan borders. Here for example, the alignment of the arms as particular regions will ease the adjustment angular direction.
  A more advanced solution is combining the sub-scans by at least a squared fitting process of overlapping regions of the sub-scans. The relative spatial angle between the sub-scans and their relative height are variables for the optimization of combining.

It is advantageous that the combining process is started with a good initial value in height and angular direction.

Generally the alignment of two sub-scans for a merger needs particular (prominent, special) regions that allow whatever algorithm to combine the sub-scans.

For example, a cylinder has no particular point in angle because it's round and no height because the sun-scans are parallel. Proper combining isn't possible.

A cone can be easily combined in height because the cut-borders are particular in height, but not in angle because the cone is round.

A prism can be easily combined in angle due to its particular edges, but not in height because the edges are parallel.

At combining of horizontal sub-scans of the human body, alignment of the arms as particular regions will ease the alignment in angle direction. Alignment in height is more difficult, even with a least squares fit due to the lack of particular regions of the body in this direction because the body is similar to cylinders. Therefore, it is advantageous to rely on calibration measurements to have reliable height values and the stiffness of the mast.

Model Correction

The raw sub-scan(s) is (are) imperfect due to parts of body hidden by hair or contact between limbs and body. This has to be corrected.

Limb Separation

Dependent on the body constitution and the user's discipline of keeping correct body posture, there will be cases where the upper arms are partially in full contact to the chest and/or the upper legs are in contact to each other, as shown in FIG. 5. They cannot be separated by a simple scan.

Therefore such case has to be identified and
  i. An error message has to be given to the user to repeat in a better way or
  ii. In an advantageous way, the limbs have to be separated automatically in a model correction step using some a-priory assumptions about the human anatomy, as shown in FIG. 6.

Therefore it is necessary to at first identify the borderlines between limbs and limbs, or limbs and chest. This can be found by identifying discontinuities in the 3D body model surface or identifying changes of the normal vector of adjacent triangles (mesh elements) are observed.

Surface Interpolation

There may be parts of the body surface invisible to the body scanner, like the surface of the head covered by hair, the soles on the turntable, and the aforesaid invisible areas between the limbs, as seen in FIG. 5.

Such areas have to be artificially reconstructed by a-priory information of the geometry of the human body with best fit to the borders of visibility or lines of body part contact, as shown in FIG. 6.

It is clear that such interpolations may introduce errors, but it is assumed that they are small and these interpolations are essentially necessary for the function of the post processing.

For limb-chest, limb-limb, and sole interpolation, flat surfaces are recommended.

For the head, elliptical-spherical surfaces are recommended.

Limb Re Rendering

Generally, all measurement paths of merit for apparel size estimation or fitness/healthcare applications are either:
  Tangential around the body or limb in a plane perpendicular to the body or limb axes
  Or along (parallel) the body axes or limb axes (bone direction).

Reference is made to FIGS. 9 to 11.

Therefore it is advantageous to provide the final natural body model in that way as shown in FIG. 8.

This reformatted final 3D body model will be called "natural 3D body model". This is advantageously used as a basis for all further application-specific post processing. This natural 3D body model minimizes the processing effort for further post processing steps, but models with other meshing schemes could be used too.

Post-Processing for Apparel Sizes

The purpose of this post-processing is to provide sufficiently accurate data to allow online apparel retailers to reduce the cost of goods returned.

Measurement Path Creation

To characterize a human body, typical measurement paths are in use. The measurement path may vary from continent to continent and apparel company to apparel company, but generally they can be mainly divided in:

Tangential oriented (related to a pane perpendicular to the vertical body axis) measurement paths, for example:
Head circumference
Chest circumference
Vertical oriented (parallel to the vertical body axis or limb axis) measurement paths, for example:
Arm length
Leg length
Radial and other measurement paths, for example:
Foot length and width
Examples therefore are shown in FIGS. 9 to 11.
Body Parameter Extraction for Apparel Sizes
In the body parameter extraction, the body dimensions are integrated along the previously defined measurement paths as seen in FIGS. 9 to 11.

Avatar Creation

The avatar creation composes an unspecific, anonymous body model as a mannequin by sphere surfaces, circular and elliptic cylinder surfaces, and circular and elliptic conical surfaces with a sufficient accuracy for the apparel industry. An example is given in FIG. 12.

Apparel Confection Size Calculation

There are a variety of apparel sizing systems available which vary from continent and apparel company. FIGS. 13 and 14 show two examples.

These can be served by:
(i) Submitting the body dimensions or the avatar to the apparel retailer and let them handle it, or
(ii) Loading a conversion table from the apparel retailer to calculate the fitting confection size.

Post Processing for Fitness and Healthcare

Body Mass and Body Height

Body mass volume and height are elementary parameters obtained by any scan. They can also be used in an advantageous way to automatically identify various users. To identify a user, the system will create classes of the following parameters: body height, weight, and dimensions. If a scan is fitting in an available class, the user can then be identified. When making consecutive measurements to track the progress, the classes are adaptively changed with a sliding window to keep the user identifies.

This algorithm isn't limited to body mass volume or height. Other obtained parameters like gender or body constitution, eye distance, and so on, can be included as differentiators too.

Body Mass Index, Body Fat Content, Body Fat Percentage

The simplest parameters to be calculated are body mass index (BMI), and body fat content/percentage. BMI can be calculated with the following numerical inputs: measured body weight, and body height. Body fat content/percentage can be calculated with the Siri or Brozek equation using the body volume, which can be obtained from integrating the volume of the body through the 3D scan of the user along with the measured body weight.

The values are stored in an advantageous way either in the 3D body scanner or in the cloud to allow any time review of the history and diet progress.

Body Muscle Growth Progress and Loss of Body Fat and Weight

One big advantage of the 3D body scanner is the possibility to monitor in a detailed way the progress of body muscle growth or weight/body fat reduction. In these cases, it is advantageous to give the user more detailed feedback then just change of weight or circumference.

The proposed method is to compare the actual natural 3D body model with a stored historical image, calculate the 3D differences, and display the result as a color scale rendering on the surface of the 3D body model, as shown in FIG. 15.

Furthermore, the 3D differences in the body can be cross-checked and correlated with changes in body fat percentage to determine whether the 3D differences are due to gain of muscle mass or gain of fat mass.

For a more detailed analysis, it is also advantageous to compare the change in cross section of, e.g., the upper arm in the plane perpendicular to the bone axis to see the progress in biceps growth, as shown in FIG. 16.

Similar can be done for tracking of belly or hip fat loss by observing a cross section in the traversal body plane, as shown in FIG. 17.

Lung Volume

Lung volume monitoring is important for endurance athletes as well as people suffering from asthma disease. Therefore, the 3D body scanner can calculate the volume of the lung by the volume difference between a scan when fully inhaled and fully exhaled.

Pregnancy Tracking

The change of body constitution in case of pregnancy can be done with the 3D body scanner without any risk on health.

Modifications and variations can be made to the embodiments illustrated or described herein without departing from the scope and spirit of the invention as set forth in the appended claims.

The invention claimed is:

1. A method for using a smart body scanner to generate a 3D model of a body for online apparel retail, fitness, and healthcare applications, comprising:
   rotating a body in front of a body scanner with a plurality of depth sensors implemented in the body scanner to generate and collect depth data, and using the depth data for creating 3D depth images of the body;
   in a hardware processing step, generating and recording part images from the 3D depth images, wherein the recorded part-images include saturated bright regions and lost dark regions;
   in a pre-processing step, using High Dynamic Range (HDR) processing to combine depth data obtained in the saturated bright regions with depth data obtained in the lost dark regions; and
   in a model fusion step, creating a single 3D body model from a stream of the 3D depth images obtained from multiple angles of view during rotating of the body.

2. The method as in claim 1, wherein the pre-processing step further comprises distortion correction.

3. The method according to claim 1, wherein the model fusion step further comprises reformating uneven triangles of vertices (3D points) of an initial mesh in the 3D depth images into different meshes with vertices in equidistant slices in height.

4. The method according to claim 1, wherein the model fusion step further comprises combining sub-scans to generate a complete rough 3D body model.

5. The method according to claim 4, further comprising model correction to correct for imperfections in raw sub-scans due to parts of the body hidden by hair or contact between limbs and body.

6. The method according to claim 5, wherein the model correction comprises limb separation by identifying borderlines between limbs and limbs, or between limbs and chest.

7. The method according to claim 6, wherein the model correction comprises surface interpolation by artificial reconstruction by a-priory information of geometry of the body with a best fit to visible borders of the body or the identified borderlines in the 3D body model to create a final 3D body model.

8. The method according to claim 7, further comprising reformatting the final 3D body model into a natural 3D body model.

9. The method according to claim 8, further comprising post-processing of the natural 3D body model for any one or combination of: apparel sizes by measurement path creation, body parameter extraction for apparel sizes, avatar creation, or apparel confection size calculation.

10. The method according to claim 8, further comprising post-processing of the natural 3D body model for fitness and healthcare applications by obtaining any one or combination of: body mass and body height, body mass index, body fat content, body fat percentage, body muscle growth progress, loss of body fat and weight, lung volume, or pregnancy tracking.

11. A method for monitoring body muscle growth and loss of body fat and weight, implemented with a smart body scanner having a plurality of depth sensors, the method comprising the steps of:
   rotating the body with respect to the smart body scanner in a first session;
   scanning the rotating body with the plurality of depth sensors during the first session;
   generating a first plurality of 3D depth images of the body from each of a plurality of viewing angles during rotating of the body in the first session;
   creating a first 3D body model from the first plurality of 3D depth images;
   rotating the body with respect to the smart body scanner in a second session at a predetermined time after the first session;
   scanning the rotating body with the plurality of depth sensors during the second session;
   generating a second plurality of 3D depth images of the body from each of a plurality of viewing angles during rotating of the body in the second session;
   creating a second 3D body model from the second plurality of 3D depth images;
   comparing the second 3D body model to the first 3D body model to determine differences in the generated 3D depth images of each 3D body model;
   using the differences in the generated 3D depth images of each 3D body model to generate a third 3D body model in which there are assigned regions of varying brightness or color proportional to the differences in the generated 3D depth images of each 3D body model;
   displaying the third 3D body model with regions of varying brightness;
   scanning the rotating body during the second session with scanners from which body fat percentage is determined; and
   correlating the regions of varying brightness with changes in body fat percentage for those regions to determine whether the differences in the generated 3D depth images of each 3D body model are due to changes in muscle mass or fat mass.

* * * * *